United States Patent [19]
Hopfer

[11] 3,763,431
[45] Oct. 2, 1973

[54] MICROWAVE TRANSMISSION LINE MEASURING SYSTEM

[75] Inventor: Samuel Hopfer, Brooklyn, N.Y.

[73] Assignee: General Microwave Corporation, Farmingdale, N.Y.

[22] Filed: Feb. 17, 1971

[21] Appl. No.: 116,143

[52] U.S. Cl. .................... 324/95, 324/58 B, 333/9
[51] Int. Cl. ...................... G01r 21/04, G01r 27/04
[58] Field of Search ............ 324/58 B, 58 R, 58.5 B, 324/58.5 R, 95; 333/6, 9, 84 M

[56] References Cited
UNITED STATES PATENTS

| | | |
|---|---|---|
| 2,616,951 | 11/1952 | Moreno .............................. 324/58 B |
| 3,165,711 | 1/1965 | Drumheller et al. ................. 333/9 X |
| 3,359,510 | 12/1967 | Geiszler .............................. 333/9 X |

Primary Examiner—Alfred E. Smith
Assistant Examiner—Ernest F. Karlsen
Attorney—Morton C. Jacobs

[57] ABSTRACT

A reflectometer is constructed with a thin-film resistive network in a planar Y-junction configuration.

20 Claims, 9 Drawing Figures

INVENTOR.
Samuel Hopfer

BY

*Morton V. Jacobs*

ATTORNEY

INVENTOR.
Samuel Hopfer
ATTORNEY

INVENTOR.
Samuel Hopfer
BY
ATTORNEY

INVENTOR.
Samuel Hopfer

MICROWAVE TRANSMISSION LINE MEASURING SYSTEM

BACKGROUND OF THE INVENTION

This invention relates to the measurement of characteristics of microwave transmission lines, and particularly to a reflectometer suitable for that purpose.

Reflectometer apparatus for such measurements is described, for example, in U. S. Pat. No. 2,630,473, which describes a lossless T-junction configuration of coaxial sections and the measurement of currents flowing into and out of that junction. A microwave generator is connected as the input to the leg thereof and a load is connected to one arm and a matching impedance to the other arm. The difference of currents in the load and matched arms is measured and compared with that in the leg of the T-junction through the magnetic inductions associated with the currents which are picked up by means of coupling loops; one loop is in the plane of the arms of the T-junction and the other in the plane of the leg and at right angles to the plane of the arms. At a condition of balance, the leg current flowing in one direction relative to the junction should equal the sum of the currents in the arms flowing oppositely relative to that junction. As the aforementioned patent indicates, these loops carry currents that are respectively proportional to the vector difference in the currents of the two arms and the vector sum of those currents, and the ratio of the absolute magnitudes of those loop currents can be used as a measure of the ratio of the reflected and incident waves which is the reflection coefficient of the load. Such apparatus is by its nature limited in the low frequency response.

SUMMARY OF THE INVENTION

It is among the objects of this invention to provide a new and improved apparatus for microwave transmission line measurements.

Another object is to provide a new and improved transmission line measuring apparatus which is highly accurate.

Another object is to provide a new and improved microwave reflectometer.

Another object is to provide a new and improved microwave reflectometer suitable for use at low frequencies.

Another object is to provide a new and improved system for reflectometer measurements with continuously varying microwave frequency.

In accordance with one embodiment of this invention, three current paths in the form of resistive thin-film elements are mounted in coplanar relation on a planar dielectric sheet and joined in a Y-junction in a symmetrical relation which has both a rotational and a lateral symmetry. A first diode detector is connected across the resistive elements in two of the paths to derive signals proportional to the difference in currents therein. A pair of second diode detectors are each mounted across the resistive elements in the remaining path, and respectively on opposite sides thereof. The planar sheet and circuit elements thereon are mounted in a strip line relation between a pair of conductive plates that form ground planes for the strip line. In operation, the first diode detector develops signals proportional to the difference in currents in the associated resistive elements, and the second diode detectors develop signals proportional to the sum of those currents.

In use, a matched standard impedance is coupled to one of the paths, and a load to another. A microwave generator is coupled to the third path, and the generator currents in the third path represent the sum of the currents to the standard and load paths. The ratio of the two detected signals is a measure of the reflection coefficient of the load.

In one arrangement of the invention, the incident signal is maintained constant over a range of frequencies by means of a sweep frequency generator and a feedback circuit to adjust the generator output over the frequency range to produce the constant incident signal.

BRIEF DESCRIPTION OF THE DRAWING

The foregoing and other objects of this invention, the various features thereof, as well as the invention itself, may be more fully understood from the following description when read together with the accompanying figures, in which.

In the drawings, corresponding parts are referenced throughout by similar numerals.

DESCRIPTION OF A PREFERRED EMBODIMENT

Figure 5:
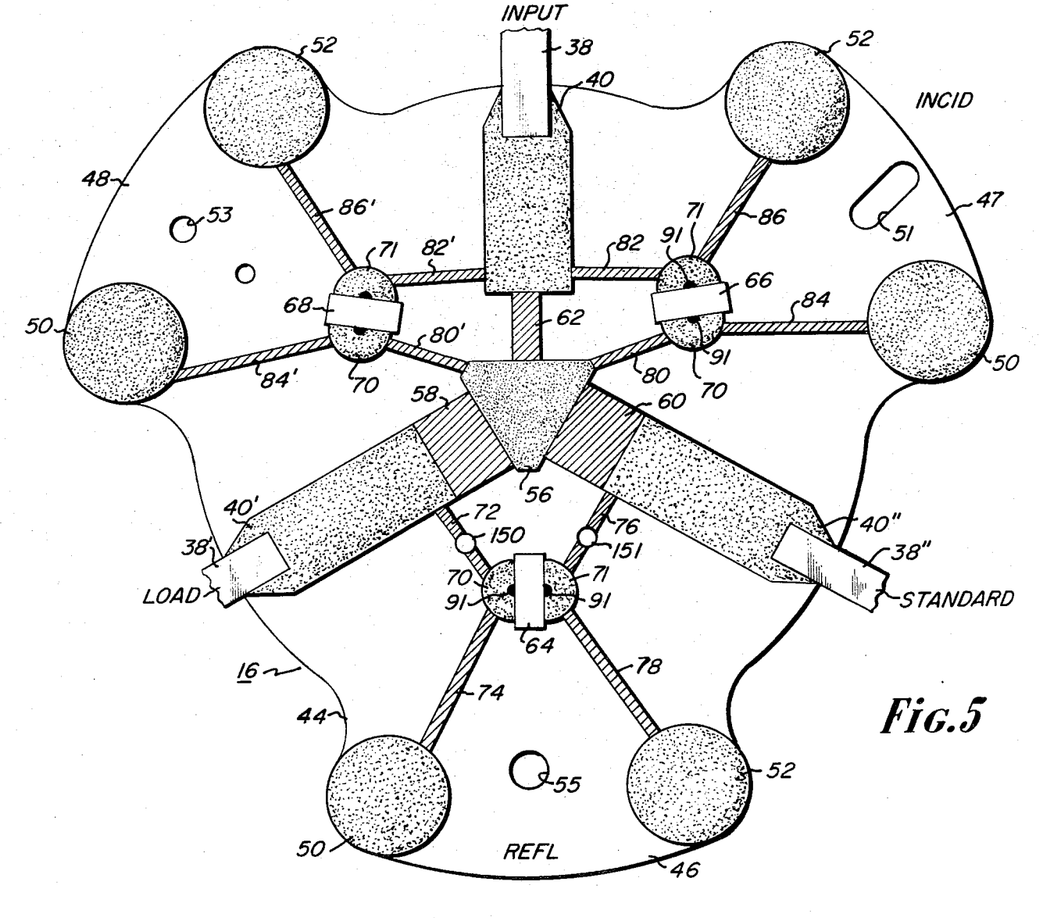
FIG. 5 is an enlarged plan view of a circuit assembly mounted in the casing of FIG. 2.

The casing 10 of the reflectometer is constructed of three aluminum blocks 12, 14 and 15 and formed in a generally triangular shape, which corresponds to the configuration of a circuit assembly which is illustrated in FIG. 5 and forms the heart of the instrument. Between the faces of the lower block 12 and middle block 14, the circuit assembly 16 of FIG. 5 is mounted and secured. On the upper face of the middle block 14, a number of connections and circuit elements are mounted, and the upper cover block 15 serves as the upper face of the instrument. This upper cover block carries two output connectors 18 and 20, the terminal pairs of which are wire-connected to terminals of the connections on the top face of the middle block 14. The blocks 12, 14, 15 are secured together, for example, by threaded fasteners that are not shown in the drawing for simplicity of illustration.

Figure 6:
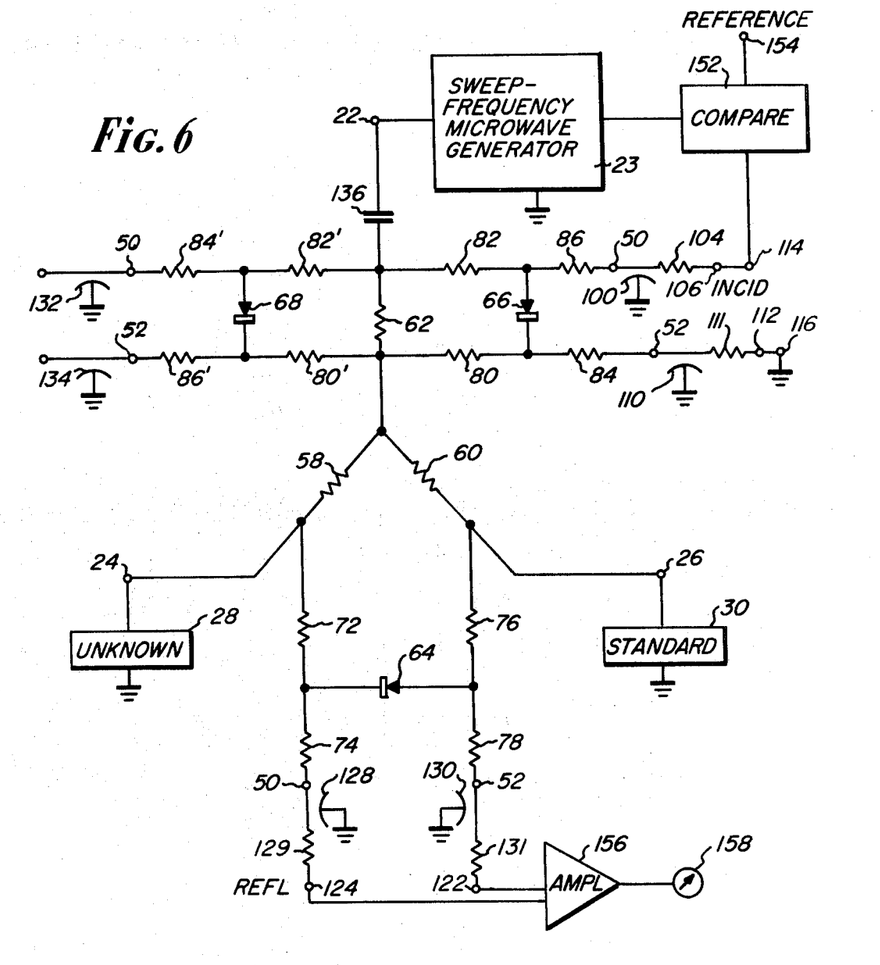
FIG. 6 is a schematic circuit diagram of the equivalent circuit of the assembly of FIG. 5 illustrated in the context of one application of this invention.

A coaxial connector 22 provides an input coupling for receiving microwave power from a generator 23 (see schematic diagram of FIG. 6). Two other coaxial connectors 24 and 26 are respectively connected to impedances to be tested by the instrument. For example, the connector 24 is connected to an unknown load impedance 28, and the connector 26 to a standard impedance 30 of characteristic impedance $Z_0$ (FIG. 6). This characteristic impedance is that of the reflectometer itself and, for example, of its coaxial connectors 22, 24, 26.

Figures 1, 3:
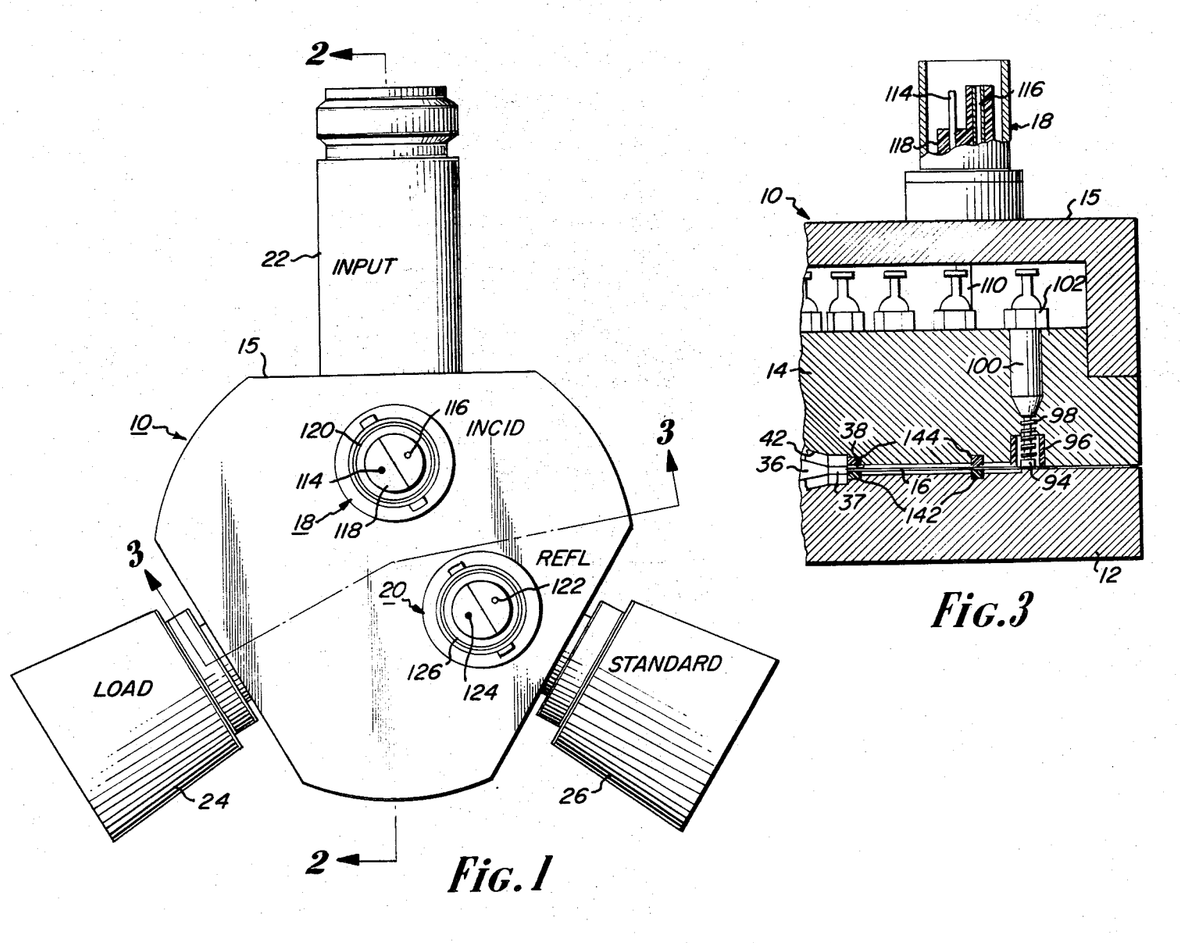
FIG. 1 is a plan view of the casing of a reflectometer embodying this invention.
FIG. 3 is a sectional view taken along the bent line 3—3 of FIG. 1.
Figure 2:
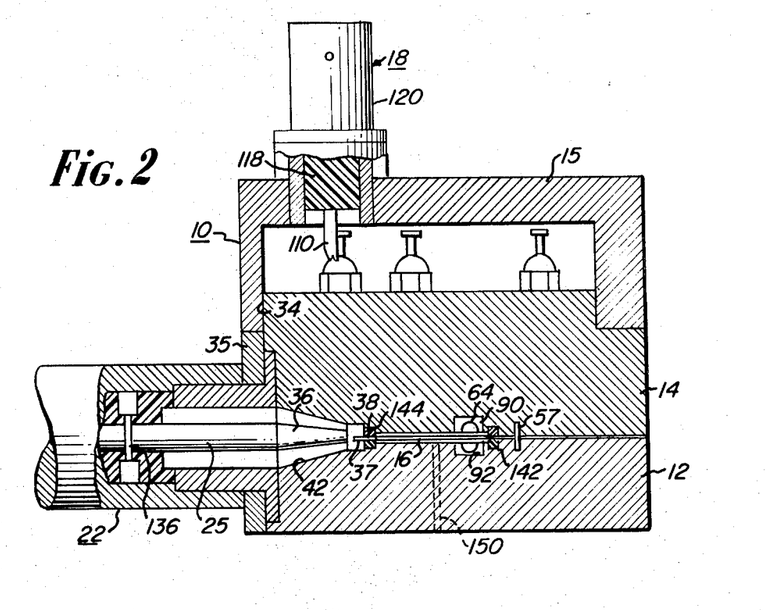
FIG. 2 is a sectional view taken along the line 2—2 of FIG. 1.

As shown in FIG. 2, the coaxial connectors 22, 24 and 26 are each fastened to the lower and middle blocks 12 and 14 by means of flanges 32 secured in recesses of the flat side faces 34 of those blocks by retaining plates 35. The circuit assembly 16 is constructed as a strip-line configuration and mounted between the ground planes produced by the blocks 12 and 14, which in turn are directly connected to the grounded outer conductors of the coaxial connectors. The coaxial connector 22 is connected to circuit assembly 16 by means of a conical coaxial transition formed of a conical center conductor 36 connected between the center conductor 25 of the connector 22 (by way of example) and cylindrical end portion 37. A machined rectangular contact 38 at the end of the conductor end portion overlies a thin-film contact strip 40 of the circuit assembly 16 (FIG. 5), and is mechanically pressed into firm contact therewith. A conical opening 42 forms the outer conductor of the coaxial transition, and is formed by two mating semi-conical openings in the lower and middle blocks 12 and 14 respectively. Similarly, mating semi-cylindrical openings in these blocks surround the cylindrical end portion 37. As shown in FIG. 5, similar rectangular contacts 38' and 38" of the load and standard connectors 24 and 26, respectively, engage thin-film contact trips 40' and 40". A similar conical transition 36 and 42 is also provided for connector 24 (FIG. 3) and for connector 26 (not shown).

The circuit assembly 16 illustrated in the enlarged view of FIG. 5 is constructed as thin-film depositions on a substrate board 44 made of dielectric material such as mica of about 1 mil thick. The board 44 has a somewhat three-sided shape and has three lobes 46, 47 and 48, in the corners of each of which circular terminal contacts 50 and 52 are formed by metallic deposition. Between the lobes 46 and 48, the contact strip 40' is deposited as a thin metallic film and contacts the coaxial-to-strip-line transition conductor 38' for the load connector 24. Similarly, between the lobes 46 and 47 of the substrate board 44 is the conductor strip 40" for the standard connector 26, and between the lobes 47 and 48 is the conductor strip 40 for the input connector 22. The contacts 50 and 52 and the strips 40, 40' and 40" are formed of a metal having negligible resistance, such as silver. Indexing holes 51, 53 and 55 in the three lobes located between associated contact areas 50 and 52 receive pins 57 that project from the lower block 12 into corresponding holes in the middle block 14 to orient the assembled position of the assembly 16 in proper relation to those blocks. The pins are preferably formed of a lossy material such as eccosorb to avoid disturbance of the electrical characteristics of the strip-line circuit.

At the center of the substrate board 44 is a triangular metallic deposition 54 of negligible resistance which forms the junction for the three current paths formed by the depositions 40, 40' and 40" that connect the circuit assembly 16 to the external microwave circuit. Between the strip path 40' and the junction 56 is a metallic deposition 58 of a certain desired resistance; and similarly, a resistive area 60 is deposited between the junction 56 and the strip path 40". Another resistive area 62 is deposited between the junction 56 and the strip path 40. However, this resistive area 62 is of substantially smaller width in its current path compared to the widths of the strip path 40 and the associated side of the junction 56. The other sides of the junction 56 are generally substantially wider than the associated resistive areas 58 and 60. The thickness of all of these metallic film deposits is made small (e.g., about 0.002 inch) relative to the skin depth at the highest operating microwave frequency for which the unit is designed (e.g., 18 GHz) to ensure proper resistive characteristics at all frequencies.

Three diodes 64, 66 and 68 are connected in circuit with the resistive strips 58, 60 and 62. The substrate connections for each diode include a pair of metallic contact terminal areas 70 and 71 deposited on either side thereof, which areas are of negligible resistance for this purpose. The diodes 64, 66 and 68 are mounted in holes in the substrate board 44, and each diode extends an approximately equal amount on opposite sides of that board, as may be seen in FIG. 2 for the diode 64. Recesses 90 and 92 are formed in the middle and lower blocks 14 and 12 to receive the diode 64 as it projects from either side of the circuit assembly 16; the other diodes 66 and 68 nest in similar recesses. A conducting epoxy 91 fastens the diode in place and ensures an adequate electrical connection.

One terminal area 70 of the diode 64 is connected via a resistive deposition strip 72 to the strip path 40', and also via a resistive deposition strip 74 to the contact 50' of its associated lobe. The other terminal area 71 of diode 64 is connected via a resistive strip 76 to the strip path 40", and via another resistive strip 78 to the other contact area 52 of its associated lobe. The terminal areas of diode 66 are respectively connected via resistive strips 80 and 82 to a corner of the junction 56 and to the strip path 40; these areas are also respectively connected via resistive strips 84 and 86 to the associated contact areas 50 and 52. The diode 68 is connected via similar resistive strips 80' and 82' to the junction 56 and the strip 40, and via similar resistive strips 84' and 86' to the associated contact areas 50 and 52, whereby the circuit for diode 68 is symmetrical to that of diode 66 with regard to their corresponding resistive connections across resistive strip 62 and also to the associated contact areas 50 and 52.

A schematic diagram of an equivalent circuit of the circuit assembly of FIG. 5 is shown in FIG. 6. Corresponding parts are referenced by the same numerals to assist in an explanation of the circuit interrelationships of the assembly 16 of FIG. 5.

Figure 4:
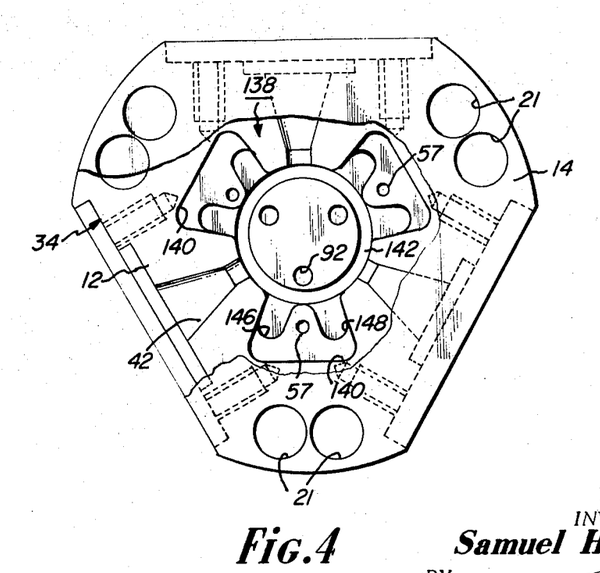
FIG. 4 is a plan view with parts broken away and removed of the reflectometer of FIG. 1.

As shown in FIG. 3, a metallic contact button 94 is movable in an insulated sleeve 96, and biased by a coil spring 98 into contact with metallic contact area 50 on the circuit assembly 16. An electrical circuit is completed from the contact area 50 to the spring, and via a shunt capacitor 100 to a terminal 102; the capacitor 100 is constructed to serve as an r-f capacitor coupling to the grounded block 14 and a d-c feedthrough connection. The terminal 102, in turn, is connected via a resistor 104 (FIG. 6) to another such terminal 106 (which terminals and the resistor are mounted on the top face of the middle board 14). Similarly, the contact 52 for diode 66 is connected via a similar arrangement, including a shunt capacitor 110 (FIG. 4) to another terminal 112. The two terminals 106 and 116 form a pair for the incident signal output, and are connected by wires 110 respectively to plug and jack contacts 114 and 116 assembled in a dielectric body 118 which is mounted in a metallic shield 120. An Incident signal output is available from the contacts 114 and 116.

In a similar fashion, a jack terminal 122 and a plug terminal 124 in a sleeve 126 provide output connections for the terminals 50 and 52 associated with the diode 64, and which represent a Reflected signal output as explained hereinafter. Capacitors 128 and 130 (FIG. 6) are provided in a manner similar to capacitor 100 in the connections that are made to contacts 50 and 52 for diode 64. In a similar fashion, capacitors 132 and 134 are arranged in contacts (not shown) similar to contact 94 for the contact areas 50 and 52 of the diode 68. However, no output signals are actually taken by way of this portion of the circuit in the illustrated embodiment; the circuit of diode 68 is provided to ensure a balanced arrangement. Alternatively, a simple resistive network may be provided to get the average Incident signal from the two symmetrical sections. A capacitor 136 is used in the center conductor 25 of power input connector 22 to isolate circuit paths in situations where the Reflection channel is not well balanced to ground.

The lower block 12 has an inner recessed section 138 for receiving the circuit assembly 16. Three shallow, lobe-shaped recesses 140 serve to seat the correspondingly shaped lobes 46, 47, 48 of the thin substrate 44. A dielectric (e.g., teflon) ring 142 seats in an annular groove in the lower block (FIGS. 2 and 3) and a similar ring 144 seats in a mating groove in the upper block. These two rings 142 and 144 engage the opposite faces of the substrate 44 and the ends of contacts 38, 38' and 38'' when the unit is assembled to ensure engagement with and electrical connection to the respective contact areas 40, 40' and 42''. Pairs of finger-like grooves 146, 148 are formed within each lobe region of the lower block, and corresponding finger grooves are formed in the upper block. These finger grooves are dimensioned to be suitably spaced from the associated resistors 74, 78, 84, 86 and 84', 86' and serve as ground planes for the strip-line construction. Similarly, the central portion 150 of the lower block and the mating portion of the upper block are similarly recessed ground planes. Thus, generally the opposing faces of the lower and middle blocks serve this ground-plane function for the strip-line sections of the assembly 16.

For operation as a reflectometer, a microwave generator 23 is connected to the input 22, and a standard characteristic impedance 30 is connected to the terminal 26 and an unknown impedance is connected to the terminal 24. In operation, and under balanced conditions, the current through the input path 40 and the associated resistor 62 (FIGS. 5 and 6) divided, with part going via the resistor 60 and the path 40'' to the standard impedance 30, and the other part to the resistor 58 and path 40' to the unknown load impedance 28. Thus the current in resistor 62 is equal to the sum of the currents in resistors 58 and 60. The diode 66 functions as a square-law detector for the current in resistor 62 and the diode circuit (including the relatively large resistors 80, 82, 84, 86) develops a voltage proportional to that current in resistor 62. The circuit of diode 68 operates in the same fashion. The diode 64, coupled as it is across the two branch resistors 58 and 60, functions as a square-law detector for the difference of these two branch currents and the associated circuit (including relatively large resistors 72, 74, 76, 78) develops a voltage proportional to that current difference. These developed voltages are developed at the associated contacts 50 and 52 and made available at the output terminal pairs 114, 116 and 122, 124.

Where the branch current to the unknown 28 is equal to the branch current to the standard 30, the unknown impedance equals the characteristic impedance of the standard and there is no reflection. The reflection coefficient K, which is the ratio of the reflected power to the incident power, is zero, and correspondingly the difference in the branch currents (detected by diode 64) is zero. If the unknown impedance is a pure reactance, there is a full reflection from the unknown impedance and its branch current is 90° out of phase with respect to the standard current. Under these circumstances, the incident power is equal to the reflected power and the reflection coefficient is equal to unity; that is, in this condition the current detected by diode 62 (which is a vector current difference) is the same as that detected by diode 66. Between these two extremes, the circuit of FIG. 5 operates to develop voltages proportional to the incident and reflection power.

Figure 7:
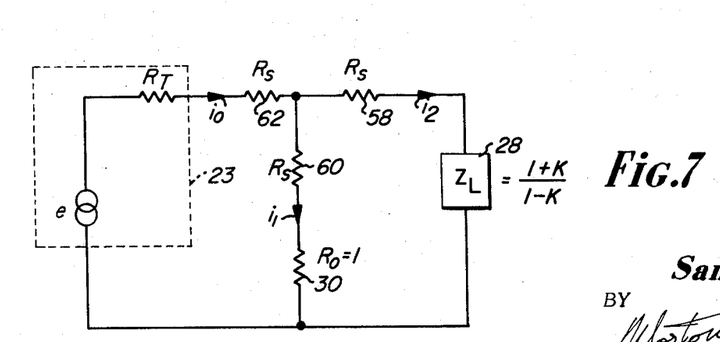
FIG. 7 is a schematic circuit diagram used in the explanation of the circuit assembly of FIG. 5.

For purposes of analysis, reference is made to FIG. 7 which is a schematic circuit representation of the microwave portion of FIG. 5 and of the junction of the microwave current paths. In FIG. 7, parts corresponding to those previously described are referenced by the same numerals and all values of the circuit elements are referred to the junction and are normalized to the characteristic impedance. Thus, the resistance $R_o$ of the standard or characteristic impedance 30 is unity. In the preferred embodiment of FIG. 5, the three junction resistors 58, 60, 62 are equi-value, which arrangement is highly desirable since over a broad frequency range the coupling of each diode should be the same. This invention may also be constructed with different values for the junction resistors.

The respective three branch currents in the junction or current-sensing resistors 58, 60, 62 of FIG. 7 are given by the following:

$$i_1 = (e/(1+R_s)B) \quad 1+K+R_s(1-K) \quad (1)$$
$$i_2 = (e/(1+R_s)B) \quad 1-K+R_s(1-K) \quad (2)$$
$$i_3 = (-2e/(1+R_s)B) \quad 1+R_s(1-K) \quad (3)$$

where $K$ is the reflection coefficient of the load, and $B$ is an expression involving $R_s$, the source impedance $R_t$, and $K$. Accordingly, the ratio of currents as below becomes $$|i_1 - i_2|/|i_o| = |K|/|1+R_s(1-K)| \quad (4)$$

For the lossless junction $R_s = 0$, the above ratio reduces to $|K|$, and for $R_s$ very small compared to the characteristic impedance, i.e., $R_s \ll 1$, it can be shown, the maximum and minimum values of equation 4 are:

$$|i_1 - i_2/i_o|_{max, min} = |K|/|1+R_s|(1 \pm R_s|K|) \quad (5)$$

It is seen from equation 5 that for $R_s \ll 1$, the current ratio determines $|K|$ within a maximum error $\pm R_s|K|$ $0|9$, since the constant factor $(1+R_s)^{-1}$ can be readily calibrated out by a simple gain adjustment. For example, if the normalized resistance $R_s = 0.03$ for each junction resistor (corresponding to a junction resistance value of 1.5 ohm in a 50-ohm system), the error is at most 3 percent for unity reflection coefficient (corresponding to the load 28 being open or short circuited), and is entirely negligible for lower values of $K$ (i.e., lower VSWR's). Thus, it is seen that a slightly resistive junction, if otherwise desirable, will affect the accuracy in only a minor way. In practice, a normalized resistance of $R_s = 0.1$ (corresponding to a junction resistance value of 5 ohms in a 50-ohm system), or less, may be suitable in applications permitting a larger error. It is evident from the foregoing that reflectivity is a property of a junction, and that a lossy or resistive junction is suitable for developing currents proportional to incident and reflected microwave energy with reasonable accuracy. Equation 4 and the circuit of FIG. 7 also indicate that the ratio of currents is independent of the source impedance $R_t$ and thus does not require the use of a matched generator.

The measurement of the current ratio in accordance with equation 4 (by any suitable ratiometer) requires that the circuits employed for this purpose respond to the respective currents only and not to the electric fields which exist between the central conductors of the junction and ground. To achieve this condition, one may filter out the electric field components, or balance out the electrically induced effects, or finally, not to couple at all to the electric field. This latter approach, although desirable, cannot be realized in a TEM transmission system. However, this objective is partially fulfilled by arranging the detection circuitry coplanar with the r-f thin-film conductors at the junction and parallel to the ground planes formed by the shielding housing blocks 12 and 14. In this way, owing to the rapid decrease of the field components as one moves away (at right angles) from the conductors on the plane of the substrate toward the ground planes of blocks 12 and 14, the major parts of the detection circuitry are effectively located in the field-free region of the substrate plane. Moreover, the larger cross-sectional dimension between the inner conductor and ground makes the balancing of electrically induced effects much easier. Thus, the diodes are so oriented that they respond largely to the currents in the plane of the substrate and are not substantially affected by electric fields between circuit plane and ground planes; that is, each diode is mounted with a central portion of its anode-cathode junction in the substrate plane and substantially equal portions projecting on opposite sides of the substrate. Thus, the diodes are linked both resistively and inductively to the current-sensing resistors 58, 60, 62 for measuring the currents therein, and the effects of those currents in the planar films are limited to their plane. Evidently, this planar construction is ideal for the application of microwave integrated circuit techniques in that complex circuits with large resistance values can be achieved by thin-film deposition and encapsulated diodes in a small planar and highly balanced arrangement. For example, in an operating embodiment, the resistors 72, 76, 80, etc. are sufficiently large (e.g., 35 ohms) to decouple the detector diodes from the very small junction resistors 58, 60, 62 and resistors 74, 78, 84, etc. are very much larger (about 5,000 ohms). In addition, the thin-film deposition techniques permit more flexibility in the r-f design of the detection circuits and are more amenable to the stringent symmetry requirements of the r-f circuits discussed below.

The current-sensing resistors 58, 60, 62 permit sufficient and essentially constant coupling in the lower frequency range down to d-c. This construction avoids the difficulties that would stem from monitoring the r-f currents via magnetic induction alone, in that the detected output would, as far as its frequency response is concerned, have to change as the square of the frequency, and any dependence on mutual inductance would rule out low frequency operation. Thus, in order to obtain sufficient and essentially constant coupling in the lower frequency range, the three current-sensing resistances $R_s$ are introduced in the three branches at the Y-junction. The effect of these current-sensing resistors is to produce voltage drops, proportional to the respective branch currents, and thus to initiate currents in the associated diode detection circuits with the circuits of diodes 66 and 68 each of which separately indicates the quantity $|i_o|$, and that circuit of diode 64 indicating $|i_1 - i_2|$. The sub-miniature diodes employed are low impedance back diodes, and form an integral part of the detection circuits.

Figure 8:
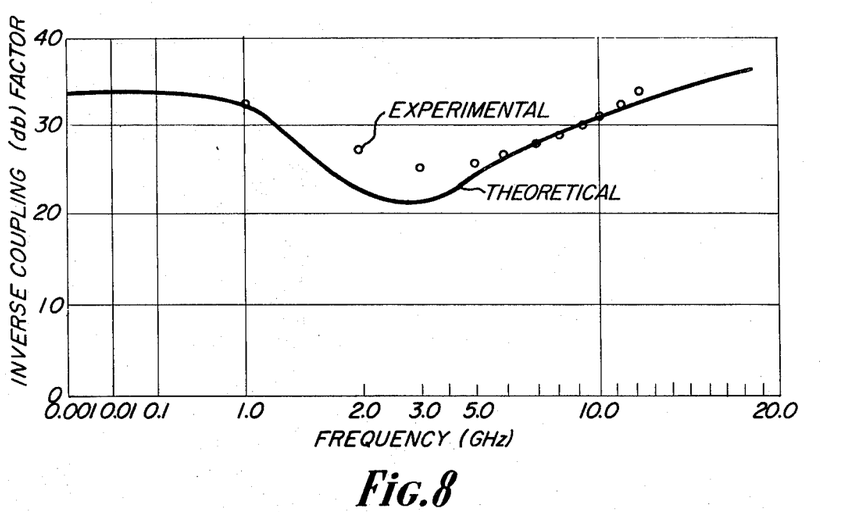
FIGS. 8 and 9 are idealized graphical diagrams representative of characteristics of the circuit assembly of FIG. 7.

If one defines the coupling factor F as the ratio of the incident power to the junction and the power absorbed by the diode 66 or 68 of the Incident circuit, it can be shown that:

$$F = \left(\frac{|3+K|^2}{16}\right) R_d \left[\frac{(1+R_e/R_d - \omega^2 L C_d)^2 + \omega^2 (R_e C_d + L/R_d)^2}{R_s^2 + \omega^2 M^2}\right] \quad (6)$$

where $R_d$ and $C_d$ are the diode resistance and capacitance respectively; $R_e$ and $L$ are the loop resistance and loop self-inductance, and where $R_s$ and $M$ are the resistance and mutual inductance of the junction respectively; $K$, as before, is the reflection coefficient of the unknown load. Inspection of equation 6 (which assumes a matched generator since coupling would vary with the generator impedance) shows that the coupling factor depends on $K$, and changes by as much as 6 db as the load (as seen at the junction) changes from a short circuit to an open circuit. Equation 6 is plotted as a theoretical curve in FIG. 8, and compared with measured data which are in very close agreement, particularly at the high frequencies where the lumped constant circuit approach is not really adequate since the electrical lengths of the components are generally substantial. The general features of the coupling response in FIG. 8 appear identifiable as to their physical significance. Thus, at the very low frequency range, the coupling is constant and governed solely by the resistive parameters of the circuit. As the frequency increases, the induced effects predominate and produce tighter coupling (smaller coupling factor). Eventually, however, the self-inductance of the loop and the capacitive shunting of the diode prevent tighter coupling from occurring and, in fact, reduce the coupling (increase the coupling factor) as the frequency is further increased. Thus, the coupling is reasonably flat over the frequency range and minor variations between paths are not substantial in affecting the tracking over the frequency range.

It is of interest to determine the limitations in frequency of the circuits of FIG. 5. As far as the low frequency limit is concerned, there is in principle no limitation, provided the reflection-measuring circuit of diode 64 is highly balanced with respect to ground, thus eliminating any coupling between the circuit of diode 64 and that of either diode 66 or diode 68. The integrated circuit techniques employed assure this degree of balance and generally permit equality of resistances within better than 1 percent, corresponding to equivalent directivities in excess of 40 db. With respect to the high frequency limitations, there are basically two problems to consider. The first is connected with the difficulty of achieving proper phase balance in the Reflection circuit of diode 64 at the higher frequencies.

Clearly, if $i_1 = i_2$, then no current should be flowing through the diode 64 of the Reflection circuit. At the higher frequencies, this condition will result if the equivalent terminal plane (i. e., effective operating plane where rectification takes place) of the diode is positioned in perfect symmetry to $i_1$ and $i_2$. Quantitatively, for small phase differences $\theta<<1$, the directivity due to this effect is given by:

$$D \text{ (db)} = 20 \log (\theta/2) \tag{7}$$

For 40 db directivity this corresponds to very small path differences of about 0.002 inch at 18 GHz. It is possible to overcome this difficulty by incorporating broad-band phase trimming adjustments, if the corrections to be affected are small to start with; that is, the transmission line characteristics between the Reflection diode 64 and the branch resistors 58 and 60 are suitably varied. One suitable technique that is employed is that of varying the line lengths of the two paths to diode 64 so that the diode is precisely at the desired symmetry point. Thus, small dielectric rods 150 and 151 are introduced (e.g., through openings in block 12 as indicated in FIG. 2) into the dielectric space at the coupling resistors 72 and 76, respectively. These rods are positioned to different depths (and retained in position by a fastening means or friction fit) to vary the dielectric over the path of one coupling resistor as against the path of the other. This adjustment introduces small perturbations and thereby continuously varies slightly the effective electric lengths to diode 64 to place it in phase balance. Other adjustments of the dielectric of the coupling paths can be used for this balancing.

A more severe limitation on the high frequency operation is connected with the fact that equation 4 holds true only at the center of the junction, yet the currents are monitored slightly away from it as shown in FIG. 5. This fact produces an error in the measurement which increases with increasing frequency. An analysis of this effect, assuming $R_s = 0$, for simplicity, leads to: Corrective factor $$(i_1(\rho) - i_2(\rho)/i_o(\rho)) = |K| \times |1+j(1+K/2) \tan\beta\rho^{-1}| \tag{8}$$

where $\rho$ is an equivalent distance from the center of the junction to the point at which the current is effectively monitored, and $\beta = 2\pi/\lambda$, with $\lambda$ the wavelength. Where monitoring is effectively at the junction center, $\rho = 0$; and the reciprocal factor (a correction factor) on the right reduces to 1, so that the entire expression becomes $|K|$. The correction factor, since K is a vector, assumes positive and negative values.

Figure 9:
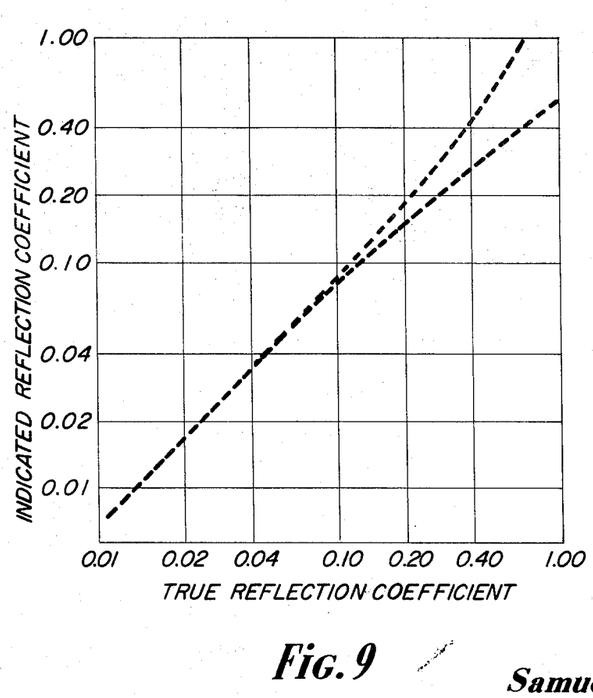

FIG. 9 is a plot of the limits of the range of indicated values of the reflection coefficient $|K|$ as given by equation 8, versus the true values of reflection coefficient; this plot is for one frequency (18 GHz) and similar plots exist at other frequencies. Equation 8 has been checked experimentally and found to represent quite adequately the physical situation. Reflectometers have been built to operate from 2 MHz to 18GHz with directivities in excess of 40 db through X band and in excess of 30 db through 18 GHz.

Notwithstanding the frequency variations, the diode circuits substantially track over the wide frequency ranges indicated above. Consequently, a sweep frequency generator 23 of any appropriate type may be employed; a ratiometer particularly suitable for reflectivity measurements with varying frequency is shown in FIG. 6. The Incident output signal at output terminal 116 is applied to a comparator 152 for comparison with a Reference signal at terminal 154 corresponding to a certain constant value of Incident power. The comparator 152 develops an error signal according to deviations of the Incident and Reference signals, and the error signal is fed back to control the power output of generator 23 in a direction to maintain the substantially constant value of Incident power corresponding to the Reference signal. Under those conditions, with the denominator of the $K$ relationship held constant, the Reflection signal at terminals 122 and 124 is directly proportional to the reflection coefficient $K$; this signal is suitably amplified with appropriate correction factors in amplifier 156 and applied to a suitable meter or indicator 158, which may be an oscilloscope appropriately synchronized to the generator 23 in a known manner for sweep frequency measurements.

The current-sensing resistor 62 for the sum current is made to be relatively narrow compared to the width of the strip path 40 and the side of the triangular junction 56 in order that accurate current measurements may be achieved notwithstanding a non-uniform current distribution in that resistor at high frequencies. When the load and standard impedances are different (a common case), the current distribution is more likely to be non-uniform. At high frequencies, the coupling between diode 66 and resistor 62 is inductive in large measure. Thus, the width of resistor 62 is chosen to provide a narrow current channel that substantially reduces the effects of a non-uniform distribution and links diode 66 with a current accurately summing the load and standard currents notwithstanding variations thereof over a substantial range.

The r-f ground for the circuit is established by the shunt capacitors 100, 110, 128, 130, 132, 134. The ground planes of blocks 12 and 14 are sufficiently far away so that a high impedance to ground of the stripline conductors is provided. For example, the grooves 146 and 148 in blocks 12 and 14 make the impedance very high for resistive strips 76, 78, 84, etc.

The lossy, resistive junction of this invention for measuring reflection coefficient can be employed with various types of junctions including a T-junction. That is, reasonably accurate approximations can be measured of the sum currents in one leg of the junction and the difference in the currents in the two branches of the junction with a T-junction (with the leg at right angles to the branch arms), as well as with the Y-junction embodiment described above, in which the leg and two branch arms are all formed symmetrically at 120° to each other. The symmetry of the Y-junction (a threefold rotational symmetry about the axis of the junction, and a lateral or 180° symmetry about any arm, and a symmetry both as to detection circuitry as well as r-f current paths) has a number of advantages in that full balance of the measurement circuits is achieved with a high degree of accuracy in the resulting measurements. That is, any cross effects tend to be equalized and neutralized.

In addition, the source current in the leg should equal the sum of the two branch currents to the load and standard impedances, since the measurement of reflection coefficient is based on this relationship. The Y-junction offers the advantage of avoiding sharp discontinuities of r-f current flow from the source-current leg to the branch-current arms, as would occur at a right-angle transition in a T-junction. Thus, such discontinuities that would result in edge effects and reduce the accuracy of the leg current equaling the sum of the branch-arm currents tend to be very much less in the Y-junction so that the desired current relationships exist with higher accuracy.

The Y-junction has additional advantages with respect to the detection of currents in the leg and two branch arms, in that the branch arms are physically more remote from the leg, which tends to reduce cross-coupling therebetween. Moreover, whatever coupling does exist tends to be balanced and neutralized inasmuch as the thin-film deposition type of construction makes it possible to achieve in a reasonable fashion the high degree of symmetry called for by the Y-junction, and for the accurate linking of the junction currents to the associated detection diodes.

The thin films are also useful in providing a planar conductive structure that avoids capacitive couplings, such as would upset the r-f properties of the circuit. Thus, the microwave strip-line form of structure achieved with the thin films located between the ground planes of the housing blocks ensures reliable operation. The thin film deposition also makes possible a high degree of precision and small dimensions that permit high accuracy measurements over a broad bandwidth of operating frequencies for which the unit can be designed. The thin films permit the formation of the extremely small current-sensing resistors that do not affect substantially the microwave circuit, as well as the large coupling resistors, and all in a compact structure.

The detection of the currents (the current sum and difference) directly at the junction offers in principle the highest accuracy, since reflectivity is a property of the junction in that, under Kirchoff's Law, the current flowing into a junction is the sum of the branch currents flowing out of it. For direct currents, this principle also applies along current paths at some distance remote from the junction. However, at r-f frequencies the current flow is not uniform along the current paths away from the junction, due to the normal variation with time, and especially where there are standing waves, which latter situation exists more or less in nearly all real situations. Thus, if currents are monitored over a length of conductor or transmission line over which current variations or phase changes take place, errors of greater or lesser magnitude may occur. It is therefore desirable to monitor microwave currents, especially at the high frequency end of the spectrum, as close to the junction as possible and over a short length of transmission line for such currents. The junction itself is the area immediately surrounding the point of intersection of the axes of the three current paths joined in the Y configuration shown in FIG. 5. This area of the triangle 56 corresponds generally to that through which the current from various portions of the path of resistor 62 would branch to the paths of resistors 58 and 60.

The dimensions of the resistors 58, 60 and 62 are chosen to be very small. In a preferred embodiment of this invention, the effective resistor length of each of these resistors is between 0.05 and 0.10 inch. In addition, the distance in that embodiment between the center of the resistor to the center point of the junction area corresponds to 0.05 to 0.10 inch. For a reflectometer designed for operation over a broad bandwidth, from d-c up to 12.4 GHz, the wavelength in free space of the high operating frequency is about 1 inch, so that the average sampling of the current in the resistor 62 is less than one-tenth of that wavelength. Thus, with the monitoring of the current in resistor 62 being within a distance from the junction point which is very small with respect to the wavelength at the high operating frequency, the error is very small. The error tends to increase, with consequent lowered accuracy, where the spacing from the junction point of the resistor midpoint is as much as a quarter-wavelength. With such spacing, sufficient accuracy is generally attainable for some applications, particularly those involving low values of directivity. For $K = 0.2$ or less, the VSWR (using the formula illustrated in FIG. 7) is 1.5 or less, which corresponds to a large percentage of microwave systems for which such accuracy could be acceptable. For systems involving higher values of K and VSWR, a closer location of the source resistor 62 would ordinarily be required, as much as within an eighth-wavelength. Thus the highest operating frequency that can be employed for the reflectometer, and the closeness of the dimensions of the monitoring resistor 62 to the junction point, depend upon the error and accuracy that can be tolerated. A correction factor, as explained above in connection with equation 8, is based on the spacing of the current monitoring from the junction point.

Thus, from the foregoing description, various modifications of this invention can be made within the concept described above and set forth in the claims. Accordingly, a new and improved apparatus for microwave transmission line measurements is provided which is highly accurate, and a system for reflectometer measurements is provided which is suitable for use at low frequencies and may be used for continuously varying microwave frequencies over a broad band.

What is claimed is:

1. In a microwave measuring device the combination comprising:
   conductive means including three current paths forming a junction, at least a portion of each of said paths having a substantially resistive characteristic;
   means for respectively connecting two different impedances and a microwave source to said paths, whereby currents in the path associated with said source branch to flow in the paths associated with said impedances;
   means connected to one of said paths for deriving signals proportional to the current in said source path;
   and means connected to the others of said paths for deriving signals proportional to the difference of currents in said impedance paths.

2. A microwave measuring device as recited in claim 1, wherein said device is associated with a certain characteristic impedance; and the resistance of each of said resistive paths is substantially less than said characteristic impedance.

3. A microwave measuring device as recited in claim 1, wherein said device is associated with a certain characteristic impedance; and the resistance of each of said resistive paths is less than 0.1 of said characteristic impedance.

4. A microwave measuring device as recited in claim 1, wherein said device is associated with a certain characteristic impedance; and the resistance of each of said resistive paths is of a value within a range of 0.05 and less of said characteristic impedance.

5. A microwave measuring device as recited in claim 1, wherein said device includes a planar dielectric sheet and said coplanar current paths are formed on said sheet.

6. A microwave measuring device as recited in claim 3, wherein the resistive portions of said current paths are films having a thickness which is small relative to the wavelength of the microwave signals at the high operating frequency of the bandwidth of said device.

7. A microwave measuring device as recited in claim 1, wherein said proportional signal deriving means are connected to the resistive portions of said paths at points that are spaced from said junction a small amount compared to the wavelength at the high operating frequencies of the device.

8. A microwave measuring device as recited in claim 7, wherein the center of one of said resistive portions is spaced from said junction by less than a quarter-wavelength at said high operating frequencies.

9. A microwave measuring device as recited in claim 7, wherein the center of one of said resistive portions is spaced from said junction by less than an eighth-wavelength at said high operating frequencies.

10. A microwave reflectometer comprising:
conductive means including three current paths forming a junction, at least a portion of each of said paths having a substantially resistive characteristic;
means for respectively connecting two different impedances and a microwave source to said paths, whereby currents in the path associated with said source branch to flow in the paths associated with said impedances;
means connected to one of said paths for deriving signals proportional to the current in said source path;
and means connected to the others of said paths for deriving signals proportional to the difference of currents in said impedance paths;
said source including a sweep frequency microwave generator for supplying microwave signals varying in frequency over a certain band, and having means for varying the level of microwave power;
and further comprising:
means responsive to the difference between a reference signal and the proportional signals derived from said source path current for controlling said power varying means;
and means for indicating the proportional signals derived from said current difference.

11. In a microwave measuring device the combination comprising a planar dielectric sheet;
conductive means mounted on said sheet providing three coplanar current paths connected in a junction;
means for respectively connecting different impedances and a microwave source to said current paths at terminals spaced from said junction;
and means for deriving signals proportional to the current in one of said paths and the difference in currents in the others of said paths.

12. A microwave device as recited in claim 11, wherein said three current paths are mounted in a Y-junction configuration.

13. A microwave device as recited in claim 12, wherein said current paths have rotational and lateral symmetry.

14. A microwave device as recited in claim 11, and further comprising means for deriving a signal proportional to the ratio of said signals.

15. A microwave device as recited in claim 11, wherein said current paths include resistive portions.

16. A microwave device as recited in claim 15, wherein said means for deriving signals proportional to the current in said one path includes two detector means connected across the resistive portion of said one path, said detector means being symmetrically located on opposite sides of said one path.

17. A microwave device as recited in claim 11, and further comprising a pair of conductive members respectively mounted on and spaced from opposite faces of said sheet to form spaced ground planes for said current paths.

18. A microwave device as recited in claim 17, wherein said current paths are thin films forming striplines between said conductive members.

19. A microwave device as recited in claim 18, and further comprising means for varying the transmission line characteristics between said other paths and the associated diode whereby the symmetry of the connections of the associated diode can be adjusted.

20. A microwave device as recited in claim 17, wherein said signal deriving means includes separate diodes each connected with a conductive path thereof parallel to said planar sheet and other portions symmetrically located to be projecting above and below said sheet, whereby said diode path is transverse to the electric field to said ground planes and currents tend not to be induced therein by said field.

* * * * *

UNITED STATES PATENT OFFICE
CERTIFICATE OF CORRECTION

PO-1050 (5/69)

Patent No. 3,763,431  Dated Oct. 2, 1973

Inventor(s) Samuel Hopfer

It is certified that error appears in the above-identified patent and that said Letters Patent are hereby corrected as shown below:

Col. 6, line 57-58, "$\pm R_s |K \ 0|9$," should be -- $\pm R_s |K|$, --

Col. 9, line 42 " $(i_1(p) - i_2(p)/i_o(p)) = |K|x|1+j \ (1+K/2) \ \tan\beta p^{-1}$"

Should be -- $(i_1(p) - i_2(p)/i_o(p)) = |K|x|1+j \ (1+K/2) \ \tan\beta p|^{-1}$ Signed and sealed this 1st day of October 1974.

(SEAL)
Attest:

McCOY M. GIBSON JR.
Attesting Officer

C. MARSHALL DANN
Commissioner of Patents